US010046778B2

(12) United States Patent
Crane et al.

(10) Patent No.: US 10,046,778 B2
(45) Date of Patent: Aug. 14, 2018

(54) VEHICLE COMMUNICATION SYSTEM

(71) Applicant: General Electric Company, Schenectady, NY (US)

(72) Inventors: Stephen Michael Crane, Erie, PA (US); David Bardo, Erie, PA (US); Serkan Gitmez, Erie, PA (US); Todd Yarrington, Erie, PA (US); Phil Tullai, Erie, PA (US); Misty Chambers, Erie, PA (US); Chris Pallo, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/347,817

(22) Filed: Nov. 10, 2016

(65) Prior Publication Data
US 2017/0129511 A1 May 11, 2017

Related U.S. Application Data

(60) Provisional application No. 62/253,158, filed on Nov. 10, 2015.

(51) Int. Cl.
*B61L 15/00* (2006.01)
*B61K 9/02* (2006.01)
(Continued)

(52) U.S. Cl.
CPC ............ *B61H 11/00* (2013.01); *B60T 13/665* (2013.01); *B60T 17/228* (2013.01);
(Continued)

(58) Field of Classification Search
CPC ... B61H 1/00; B61H 3/00; B61H 5/00; B61H 11/00; B61H 13/00; B61H 7/126;
(Continued)

(56) References Cited

U.S. PATENT DOCUMENTS 3,716,274 A * 2/1973 Pier .................. B60T 13/665
303/16
4,468,597 A 8/1984 Baumard et al.
(Continued)

FOREIGN PATENT DOCUMENTS

EP 1719688 11/2006

OTHER PUBLICATIONS

Ellingwood, "An Introduction to Networking Terminology, Interfaces, and Protocols," Jan. 14, 2014, Digital Ocean, https://www.digitalocean.com/community/tutorials/an-introduction-to-networking-terminology-interfaces-and-protocols.*

*Primary Examiner* — Thomas G Black
*Assistant Examiner* — Sara J Lewandroski
(74) *Attorney, Agent, or Firm* — GE Global Patent Operation; John A. Kramer

(57) ABSTRACT

A communication system uses a vehicle system controller to control operation of a vehicle system. An electronic air brake (EAB) controller and an electronically controlled pneumatic (ECP) brake controller control operation of a brake of the vehicle system. One or more network connections communicate data packets between the vehicle system controller and the brake controllers to allow the vehicle system controller to control the brake of the vehicle system using data packets communicated between or among two or more of the vehicle system controller, the EAB controller, or the ECP controller to allow the vehicle system controller to control the brake of the vehicle system.

17 Claims, 4 Drawing Sheets

(51) Int. Cl.
*B61H 11/00* (2006.01)
*B60T 13/66* (2006.01)
*B61L 27/00* (2006.01)
*B60T 17/22* (2006.01)

(52) U.S. Cl.
CPC ....... *B61L 15/0036* (2013.01); *B61L 15/0072* (2013.01); *B61L 27/0094* (2013.01)

(58) Field of Classification Search
CPC ...... B61H 7/124; B61H 7/128; B61H 17/228; B61L 15/0018; B61L 15/0036; B61L 15/0054; B61L 15/0063; B61L 15/0072; B61L 15/0081; B61L 15/009; B61L 23/02; B61L 25/02; B61L 25/04; B61L 27/0083; B61L 27/0088; B61L 27/0094; B60T 1/00; B60T 7/00; B60T 7/02; B60T 7/12; B60T 7/16; B60T 11/10; B60T 13/24; B60T 13/74; B60T 13/66; B60T 13/662; B60T 13/665
See application file for complete search history.

(56) References Cited

U.S. PATENT DOCUMENTS

| | | | |
|---|---|---|---|
| 4,582,280 A | 4/1986 | Nichols et al. | |
| 5,982,595 A | 11/1999 | Pozzuoli | |
| 6,036,284 A | 3/2000 | Pettit et al. | |
| 6,347,840 B1* | 2/2002 | Marra | B60T 13/665 303/15 |
| 6,435,624 B1* | 8/2002 | Kull | B60T 13/665 303/15 |
| 7,276,873 B2 | 10/2007 | Gallagher et al. | |
| 7,720,639 B2 | 5/2010 | Kirchner et al. | |
| 8,126,679 B2 | 2/2012 | Jammu et al. | |
| 8,297,201 B2 | 10/2012 | Mercier et al. | |
| 8,532,850 B2 | 9/2013 | Cooper et al. | |
| 8,589,003 B2 | 11/2013 | Brand et al. | |
| 8,645,010 B2 | 2/2014 | Cooper et al. | |
| 8,655,517 B2 | 2/2014 | Brand et al. | |
| 8,682,559 B2 | 3/2014 | Kraeling et al. | |
| 8,798,821 B2 | 8/2014 | Kraeling et al. | |
| 8,825,239 B2 | 9/2014 | Cooper et al. | |
| 8,903,574 B2 | 12/2014 | Cooper et al. | |
| 8,914,170 B2 | 12/2014 | Kraeling et al. | |
| 8,935,022 B2 | 1/2015 | Cooper et al. | |
| 9,026,268 B2 | 5/2015 | Kumar et al. | |
| 2002/0147538 A1* | 10/2002 | Marra | B60T 8/1705 701/70 |
| 2004/0090111 A1* | 5/2004 | Root | B60T 13/662 303/7 |
| 2006/0279884 A1 | 12/2006 | Valdes et al. | |
| 2007/0055843 A1 | 3/2007 | Lameter et al. | |
| 2011/0093144 A1* | 4/2011 | Goodermuth | B60T 13/665 701/20 |
| 2011/0112706 A1* | 5/2011 | Marra | B60T 13/665 701/19 |
| 2013/0344802 A1* | 12/2013 | Armour | H04W 84/005 455/39 |
| 2014/0236319 A1 | 8/2014 | Richetta et al. | |
| 2016/0016596 A1* | 1/2016 | Naylor | B61L 15/0027 709/220 |
| 2017/0096154 A1* | 4/2017 | Hurst | B61L 25/025 |

* cited by examiner

VEHICLE COMMUNICATION SYSTEM

CROSS-REFERENCE TO RELATED APPLICATIONS

This application claims priority to U.S. Provisional Patent Application No. 62/253,158, filed 10 Nov. 2015, the entire disclosure of which is incorporated herein by reference.

FIELD

The subject matter described herein relates to data communications, including but not limited to data communications in and/or with a vehicle system.

BACKGROUND

A vehicle system is a system that includes one or more vehicles. A vehicle consist is one example of a vehicle system that includes two or more vehicles that are coupled or linked together to travel along a route. One example of a vehicle system is a train having one or more locomotive consists. Locomotives in a consist can include a lead locomotive and one or more trail locomotives. A train will have at least one lead consist, and may also have one or more remote consists positioned further back in the train.

A vehicle system can include a number of different electro-mechanical and electrical systems. These systems include a plurality of different electronic components, which process or otherwise utilize data/information for operational purposes. Examples of electronic components in a vehicle system include data and voice radios and other communication equipment, positioning equipment (e.g., global positioning system, or GPS, components), data and video recorders, engine control systems, navigation equipment, and on-board computer and other computer systems.

Some vehicles in a vehicle system may be outfitted with various functional components, such as throttling, steering and brake systems, as well as traction control systems. The brake systems onboard the same vehicle system can include different types of brakes, such as air brakes and electronically controlled pneumatic brakes. The brake systems may each include serial connections with a controller of the vehicle system. The controller may control operations of the brake systems via the serial connections. Due to the limited data bandwidth and speed of these serial connections, the controller may be limited on how the brake systems are controlled. The controller also may have serial and/or wireless connections with other control systems onboard the vehicle system that control other operations of the vehicle system. But, due to the limited bandwidth, speed, and/or reliability of these connections, the amount and/or type of data that can be communicated between the controller and the control systems may be limited.

BRIEF DESCRIPTION

In one embodiment, a system (e.g., a communication system) includes a vehicle system controller configured to control operation of a vehicle system, an electronic air brake (EAB) controller configured to control a brake of the vehicle system by changing air pressure in a conduit extending along the vehicle system, an electronically controlled pneumatic (ECP) brake controller configured to control the brake of the vehicle system by communicating an electronic signal along an ECP line extending along the vehicle system, and one or more network connections among the vehicle system controller, the EAB controller, and the ECP brake controller. The one or more network connections are configured to communicate data packets one or more of between or among two or more of the vehicle system controller, the EAB controller, or the ECP controller to allow the vehicle system controller to control the brake of the vehicle system.

In one embodiment, a system (e.g., a communication system) includes a vehicle system controller configured to control operation of a vehicle system, one or more brake controllers configured to control operation of a brake of the vehicle system, and one or more network connections between the vehicle system controller and the one or more brake controllers. The one or more network connections are configured to communicate data packets between the vehicle system controller and the one or more brake controllers to allow the vehicle system controller to control the brake of the vehicle system.

In one embodiment, a method (e.g., for communicating with and/or within a vehicle system) includes communicatively linking a vehicle system controller configured to control operation of a vehicle system with one or more brake controllers configured to control operation of a brake of the vehicle system via one or more network connections and communicating data packets between the vehicle system controller and the one or more brake controllers to allow the vehicle system controller to control the brake of the vehicle system.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
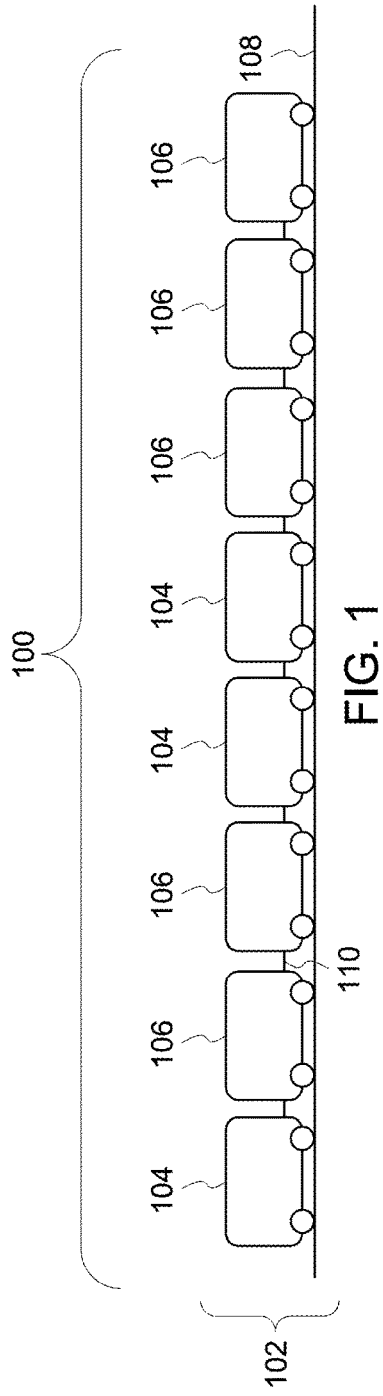
FIG. 1 illustrates a communication system of a vehicle system according to one embodiment.

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to vehicle systems such as trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles, each of which may include a vehicle consist. Additionally, a vehicle system may be formed from two or more vehicles that communicate with each other to coordinate travel of the vehicle system, but that are not mechanically linked with each other. For example, a vehicle system may include two or more vehicles that wirelessly communicate with each other so that the different vehicles may change the respective speeds, tractive efforts, braking efforts, and the like, to cause the separate vehicles to travel together as a convoy or other group along the same route.

FIG. 1 illustrates a communication system 100 of a vehicle system 102 according to one embodiment. The vehicle system 102 includes a group of vehicles 104, 106 that travel together along a route 108. The vehicles 104 can represent propulsion-generating vehicles, such as locomotives, automobiles, marine vessels, or the like, and the vehicles 106 can represent non-propulsion-generating vehicles, such as rail cars, trailers, barges, or the like. The route 108 can represent a road, track, waterway, etc. The number and arrangement of the vehicles 104, 106 are provided as one example that is not limiting on all embodiments described herein. The vehicles 104, 106 may be mechanically connected with each other by one or more couplers 110. The couplers 110 may be stretched and/or compressed between neighboring vehicles 104, 106 to allow for the length of the vehicle system 102 to vary during travel over undulations and/or curves in the route 110.

The communication system 100 includes transceiving circuitry, such as antennas, wires, modems, routers, network hubs, or the like, that communicate data between and/or among the vehicles 104, 106. The data may be communicated as network data, such as data that is packaged in packet form, meaning a data packet that comprises a set of associated data bits. Each data packet may include a data field and a network address or other address uniquely associated with a computer unit or other electronic component in the vehicle system 102 and/or communication system 100. The data can be communicated over one or more conductive pathways in the communication system 100, such as a multiple unit (MU) cable bus, a network formed from one or more Ethernet cables extending between two or more circuits, an ECP brake line, or another bus or cable.

Figure 2:
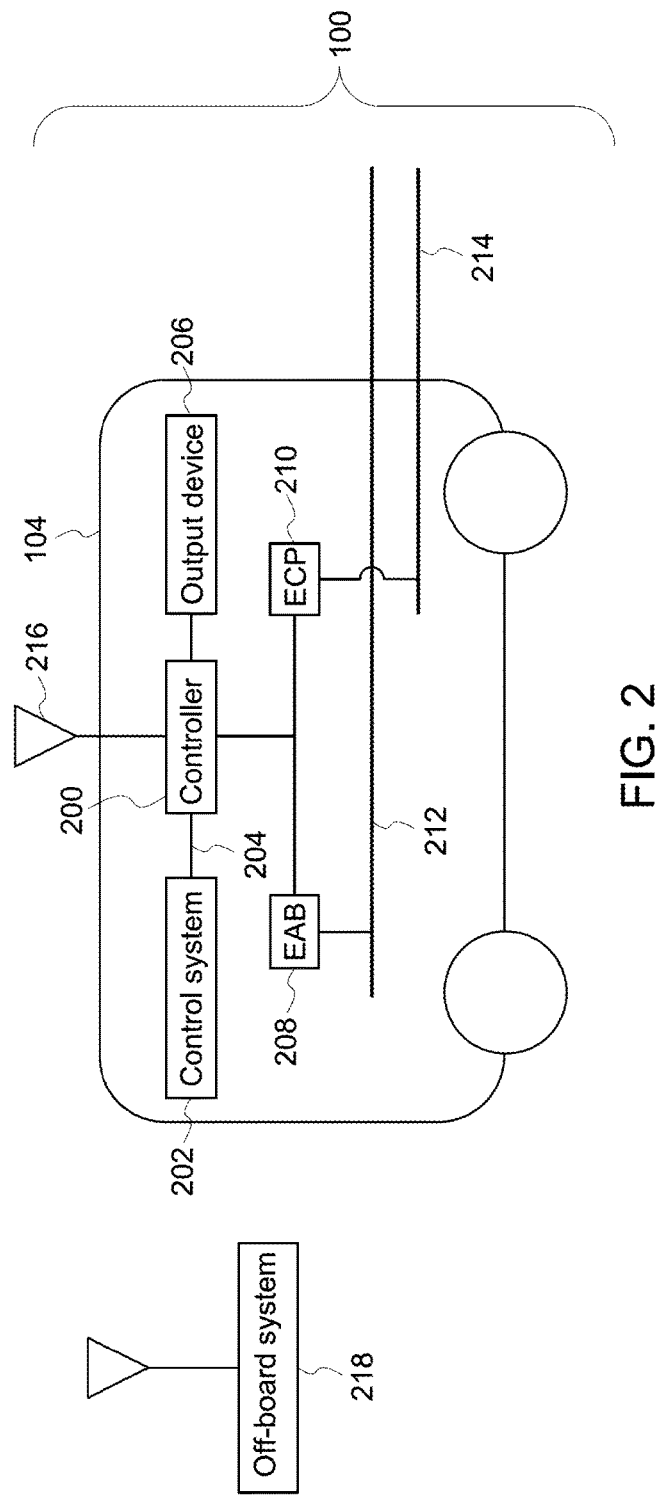
FIG. 2 illustrates the communication system onboard a propulsion-generating vehicle of the vehicle system shown in FIG. 1 according to one embodiment.

FIG. 2 illustrates the communication system 100 onboard one of the propulsion-generating vehicles 104 of the vehicle system 102 shown in FIG. 1 according to one embodiment. The communication system 100 may extend across multiple vehicles 104, 106 but is shown on only one of the vehicles 104 in FIG. 2. For example, one or more components shown in FIG. 2 also may be disposed onboard another vehicle 104, 106 in the same vehicle system 102 to allow for communication between the vehicles 104, 106.

The communication system 100 includes a vehicle controller 200 ("Controller" in FIG. 2) that represents hardware circuitry having and/or connected with one or more processors (e.g., microprocessors, field programmable gate arrays, integrated circuits, or other electronic logic-based devices) that communicate data in the communication system 100 and control one or more operations of the vehicle 104 and/or vehicle system 102. The controller 200 may include one or more input devices, such as throttles, levers, buttons, touchscreens, or the like, that allow an operator of the vehicle system 102 and/or vehicle 104 to manually control tractive effort and/or braking effort of the vehicle 104 and/or other vehicles 104, 106 in the same vehicle system 102. The controller 200 is operably connected with one or more other control systems 202 by one or more network connections 204. The control systems 202 may control other operations of the vehicle system 102 and/or vehicle 104. The control systems 202 may be supplied by the original equipment manufacturer (OEM) of the vehicle 104 or vehicle system 102, or by third party vendors. The control systems 202 may be integrated with the controller 200 or may be stand-alone systems. Examples of such control systems 202 include a distributed power (DP) system that allows propulsion-generating vehicles 104 to be remotely controlled from one or more other vehicles 104 by communicating data between the vehicles 104 via the communication system 100, an energy management system that determines trip plans that designate operational settings (e.g., throttle settings, brake settings, speeds, etc.) of the vehicle system 102 as a function of one or more of time and/or distance along the route 108 (shown in FIG. 1), a health monitoring system that receives data from sensors onboard the vehicle system 102, etc.

The controller 200 may be operably connected by one or more network connections 204 with an output device 206, such as a display, a touchscreen (which also may accept input into the controller 200), a speaker, or the like. The controller 200 may be operably connected by one or more network connections 204 with brake controllers 208, 210. In the illustrated embodiment, the brake controllers 208, 210 include hardware circuitry that include and/or are connected with one or more processors (e.g., microprocessors, field programmable gate arrays, integrated circuits, or other electronic logic-based devices) to control different brake systems of the vehicle system 102. The brake controller 208 ("EAB" in FIG. 2) represents an electronic air brake (EAB) controller that controls the pressure inside a conduit 212 that extends along the vehicle system 102 between several or all of the vehicles 104, 106 in the vehicle system 102. The conduit 212 may hold air or another fluid below a designated pressure to prevent air brakes of the vehicle system 102 from being applied. The EAB controller 208 can increase this pressure to cause the air brakes to be applied (e.g., by opening one or more values) and can increase this pressure to release the air brakes (e.g., by activating one or more compressors). The EAB controller 208 can change the pressure in the conduit 212 to communicate instructions to another controller 208 onboard another vehicle 104, 106, such as by reducing the pressure to instruct the other controller 208 to activate the air brake at the same vehicle 104, 106 in which the other controller 208 is disposed.

The brake controller 210 ("ECP" in FIG. 2) represents an ECP brake controller that communicates electric signals along a conductive pathway 214 that extends along the vehicle system 102 between several or all of the vehicles 104, 106 in the vehicle system 102. The pathway 214 may represent one or more wires, cables, busses, or the like, such as an MU cable, trainline, or the like. The ECP controller 210 can electrically communicate signals along the pathway 214 to individually control brakes onboard different vehicles 104, 106. These signals may be received by another ECP controller 210 onboard another vehicle 104, 106, which can apply the brakes of that vehicle 104, 106. In one embodiment, the pathway 214 can represent one or more other types of communication pathways, such as Ethernet cables or the like. These types of cables can increase the available bandwidth (or rate of data transfer) for communicating data in the communication systems described herein relative to other vehicle communication systems that rely on low voltage lines, wireless networks, or the like, for communicating data.

The network connections 204 shown in FIG. 2 may represent conductive pathways that connect the various components in a network. In one embodiment, the connections 204 are not serial connections, such as RS-232 or RS-422 connections, but may be other types of connections. For example, the connections 204 may represent Ethernet connections that communicate data packets or may represent other data connections.

In one embodiment, the controller 200 may remotely control air brakes or other control systems 202 onboard other vehicles 104, 106 by communicating network data over the pathway 214 that represents an MU cable. In response to an air brake on one vehicle 104, 106 failing (such as onboard the lead vehicle 104 that is remotely controlling operations of other vehicles 104 in a DP setup), the air brakes onboard the lead vehicle 104 may be remotely controlled by the controller 200 and/or one or more controllers 208, 210 onboard another vehicle 104 (e.g., a remote vehicle) in the same vehicle system 102. The controller 200, 208, 210 onboard the remote vehicle 104 can communicate signals along the pathway 214 to cause the controller 200, 208, and/or 210 onboard the lead vehicle 104 to activate or deactivate the brakes onboard the lead vehicle 104. The term "lead vehicle" can refer to a vehicle 104 that controls the operations of other vehicles 104 without the lead vehicle necessarily being disposed at the leading or front end of the vehicle system 102. The term "remote vehicle" can refer to a vehicle 104 that is remotely controlled by a lead vehicle.

The controller 200 onboard one vehicle 104 (e.g., a lead vehicle) may receive data from the controllers 200, 208, and/or 210 and/or control systems 202 onboard another vehicle 104 (e.g., a remote vehicle) and display this data on the output device 206. For example, an operator onboard the lead vehicle 104 can view the display and controls normally presented on an output device 206 onboard a remote vehicle on the output device 206 on the lead vehicle 104. The controller 200, 208, and/or 210 and/or control system 202 onboard the remote vehicle 104 can communicate the data through the pathway 214 to the controller 200 onboard the lead vehicle 104, which controls the output device 206 to display the data. The controller 200 onboard the lead vehicle 104 can receive input from the operator to remotely control set up of the remote vehicles 104 and/or to correct faults of the remote vehicles 104. For example, the operator can provide input to the controller 200 on the lead vehicle 104 to change or fix a configuration or set up of a remote vehicle 104 (e.g., the DP setup of the vehicle system 102).

Figure 3:
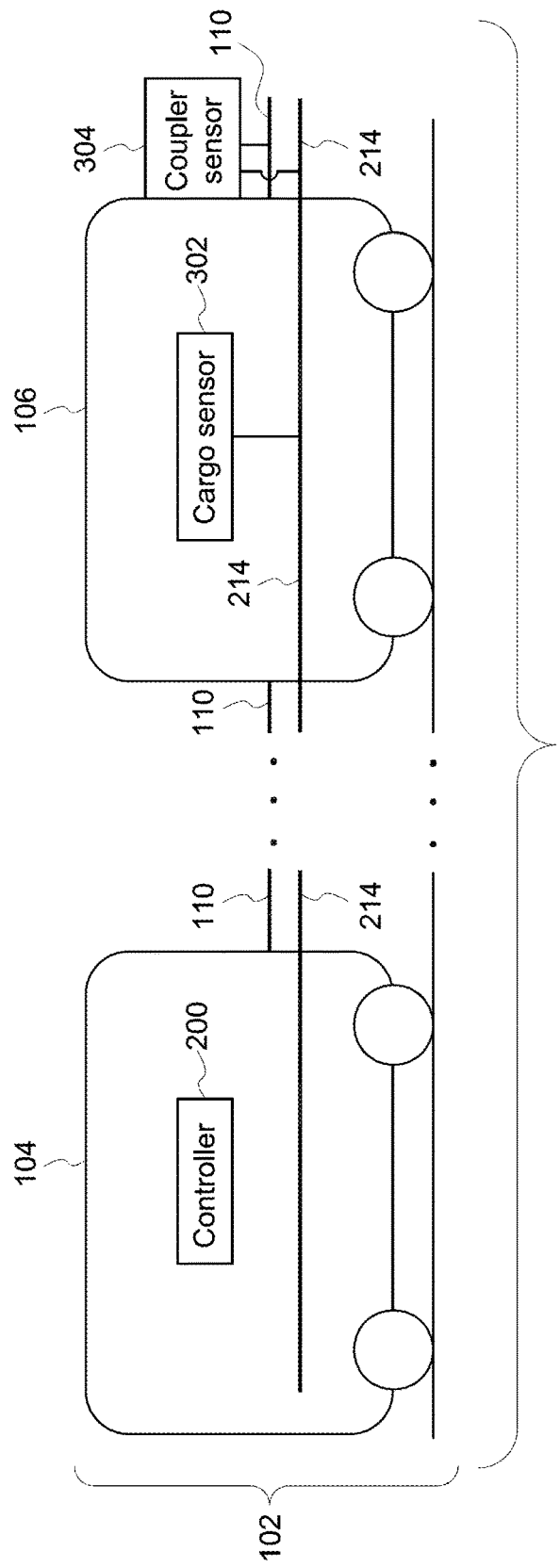
FIG. 3 illustrates another embodiment of a communication system of the vehicle system shown in FIG. 1.

FIG. 3 illustrates another embodiment of a communication system 300 of the vehicle system 102. The communication system 300 includes transceiving circuitry, such as antennas, wires, modems, routers, network hubs, or the like, that communicate data between and/or among the vehicles 104, 106 of the vehicle system 102. The data may be communicated as network data, such as data that is packaged in packet form, meaning a data packet that comprises a set of associated data bits. Each data packet may include a data field and a network address or other address uniquely associated with a computer unit or other electronic component in the vehicle system 102 and/or communication system 300. The data can be communicated over one or more conductive pathways 214 in the communication system 300, such as an MU cable bus, a network formed from one or more Ethernet cables extending between two or more circuits, an ECP brake line, or another bus or cable. The communication system 300 may include the conductive pathway 214 and the controller 200 described above. While only two vehicles 104, 106 are shown in FIG. 3, the vehicle system 100 may include more vehicles 104 and/or vehicles 106.

The communication system 300 includes one or more sensors 302, 304 that communicate data back to the controller 200 of one or more vehicles 104, 106. In the illustrated embodiment, the sensors 302, 304 are disposed onboard a non-propulsion-generating vehicle 106, but optionally may be disposed onboard one or more propulsion-generating vehicles 104. The sensor 302 represents a cargo sensor that measures one or more characteristics of the vehicle carrying cargo. The sensor 302 can represent a scale, strain gauge, or the like, that measures the weight of cargo being carried by the vehicle 106. The sensor 302 can communicate data representative of this weight back to the controller 200 via the pathway 214 as network data. The controller 200 can communicate this weight data to one or more of the control systems 202 shown in FIG. 2 to perform various functions. For example, an energy management system onboard a vehicle 104 may receive the weight data from the cargo sensors 302 onboard several vehicles 106 in the vehicle system 100 to determine a trip plan. As described above, the trip plan may designate operational settings of the vehicle system 102 as a function of time and/or distance along the route 108. The trip plan may be created and/or modified by the control system 202 based at least in part on the weight data to reduce fuel consumed and/or emissions generated by the vehicle system 102. For example, the trip plan may use throttle and/or brake settings that take advantage of downhill grades and that prepare the vehicle system 102 for travel up inclines in order to reduce the fuel consumed and/or emissions generated by the vehicle system 102 relative to the vehicle system 102 traveling at other operational settings, such as at the speed limit of the route 108, for an entire trip of the vehicle system 102.

The sensor 302 optionally can measure one or more other characteristics of the vehicle 106, such as a temperature inside a refrigerated vehicle 106, vibrations in the vehicle 106, or the like. The sensor 302 can communicate data representative of this information back to the controller 200 via the pathway 214 as network data. The controller 200 can direct the output device to display this information to the operator of the vehicle system 102 to allow the operator to monitor the status of the cargo and/or vehicle 106. In one embodiment, the controller 200 can communicate the information to one or more off-board locations. Returning to the description of the communication system 100 shown in FIG. 2, the controller 200 can be operably connected with wireless transceiving hardware, such as an antenna 216, for communicating the sensor data to an off-board system 218. Optionally, the controller 200 can communicate other data to the off-board system 218, such as a current configuration or settings of the communication system, controllers, control systems, and/or sensors.

The antenna 216 may be included in the communication system 300 shown in FIG. 3 for similar communication of the sensor data to an off-board system. The off-board system 218 can represent a dispatch facility, scheduling facility, or the like, that includes or represents hardware circuitry that includes and/or is connected with one or more processors (e.g., microprocessors, field programmable gate arrays, integrated circuits, or other electronic logic-based devices). Responsive to receiving the sensor data at the off-board system 218, the off-board system 218 may implement one or more responsive actions, such as scheduling one or more of the vehicles 106 to be dropped off (e.g., separated from the vehicle system 102) at an upcoming location, scheduling repair or inspection of the vehicle 106, etc. For example, in response to determining that the sensor data indicates that the temperature inside a refrigerated vehicle 106 is too high or too low for the safe transport of cargo, the off-board system 218 may schedule removal of the vehicle 106 from the vehicle system 102 at the next potential location for separating the vehicle 106 from the vehicle system 102 (e.g., the next rail yard), schedule inspection or repair of the vehicle 106, etc.

The sensor 304 represents a coupler sensor that measures one or more characteristics of couplers 110 that connect the vehicle 106 with one or more other vehicles 104, 106. The sensor 304 may measure the characteristics for a single coupler 110 of the vehicle 106 or for multiple couplers 110 of the vehicle 106. The sensor 304 can represent a strain gauge, a distance sensor (e.g., radar, lidar, or the like), a force sensor, etc., that measures the compression and/or tension imparted on the coupler 110. With respect to the distance sensor, the sensor 304 may measure distances between the vehicle 106 and another vehicle 104, 106 to calculate or estimate the compression and/or tension in the coupler 110. The sensor 304 can communicate data representative of the forces imparted on the coupler 110 back to the controller 200 via the pathway 214 as network data. The controller 200 can communicate this force data to one or more of the control systems 202 shown in FIG. 2 to perform various functions. For example, the controller 200 and/or an energy management system onboard a vehicle 104 may receive the force data from the coupler sensors 304 onboard several vehicles 106 in the vehicle system 100 to determine and/or modify a trip plan or to otherwise control or limit changes to control of the vehicle system 102. The trip plan and/or control limits may be determined in order to keep the forces imparted on the couplers 110 within acceptable limits, such as to prevent run-ins and/or breaks between adjacent vehicles 104, 106 in the vehicle system 102.

Figure 4:
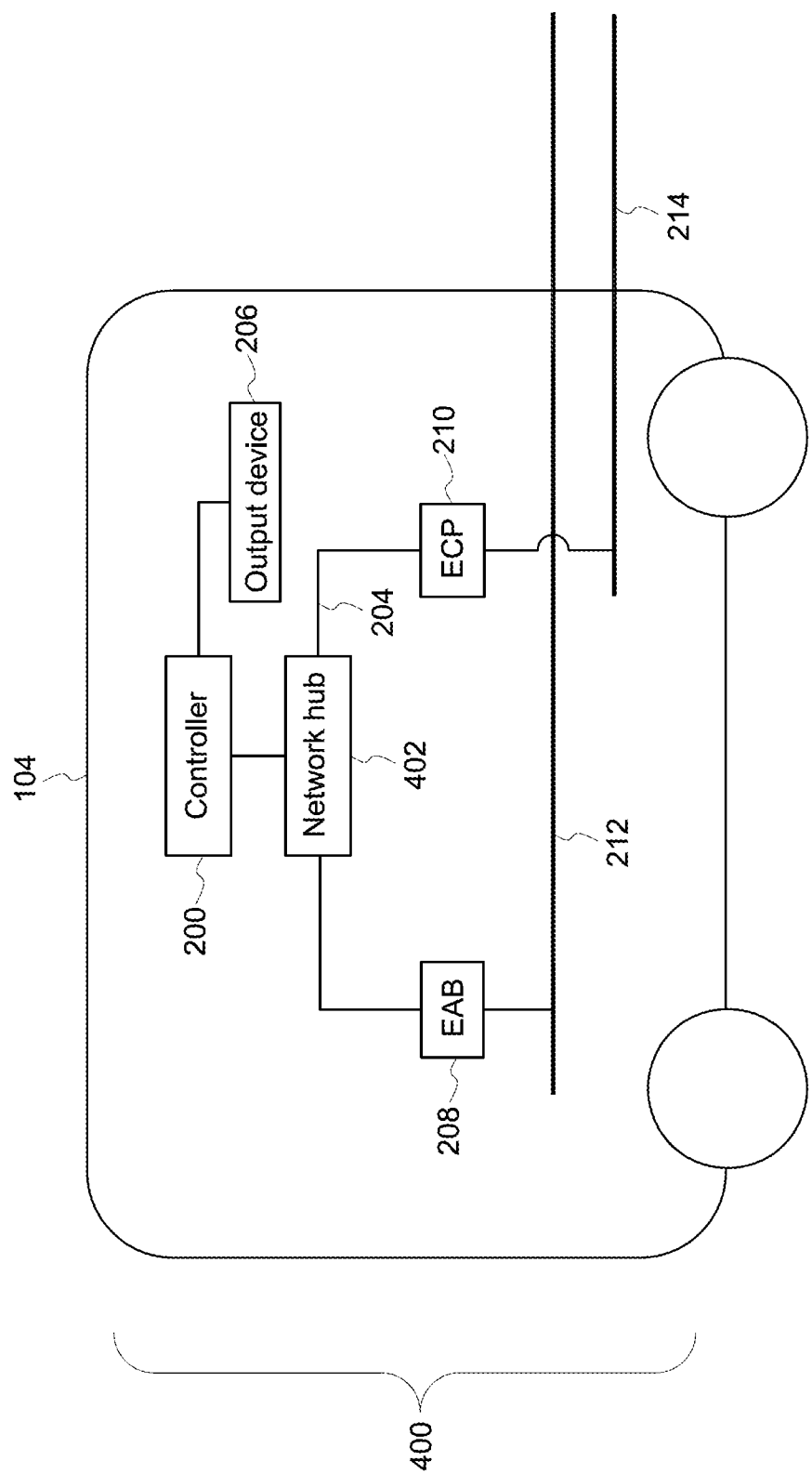
FIG. 4 illustrates another embodiment of a communication system of the vehicle system shown in FIG. 1.

FIG. 4 illustrates another embodiment of a communication system 400 of the vehicle system 102. The communication system 400 includes transceiving circuitry, such as antennas, wires, modems, routers, network hubs, or the like, that communicate data between and/or among the vehicles 104, 106 of the vehicle system 102. The data may be communicated as network data, such as data that is packaged in packet form, meaning a data packet that comprises a set of associated data bits. Each data packet may include a data field and a network address or other address uniquely associated with a computer unit or other electronic component in the vehicle system 102 and/or communication system 400. The data can be communicated over one or more conductive pathways 214 in the communication system 400, such as an MU cable bus, a network formed from one or more Ethernet cables extending between two or more circuits, an ECP brake line, or another bus or cable.

The communication system 400 includes the network connections 204 between the controllers 200, 208, 210 described above. Additionally, the communication system 400 includes a network hub 402, such as one or more routers, that are connected with the network connections 204 to communicatively couple the controllers 200, 208, 210 with each other. The network hub 402 forms a network between these components to allow the components to communicate with each other even if one or more of the network connections 204 is damaged or no longer functional. Similarly, in the event that the network connections 204 that allow communication between the controller 200 and the ECP controller 210 fail or no longer allow such communication, the controller 200 may continue communicating with the EAB controller 208 via the network hub 402. In either scenario, the controller 200 may continue controlling application of the brakes via the controller 208 or 210 with which the controller 200 can still communicate. Optionally, the controllers 208, 210 may communicate with each other via the network hub 402. For example, in the event that the controller 200 is not able to communicate with the controller 208, the controller 210 may communicate with the controller 208 to cause the brakes to be applied via the controller 208. In another example, in the event that the controller 200 is not able to communicate with the controller 210, the controller 208 may communicate with the controller 210 to cause the brakes to be applied via the controller 210. The network hub 402 allows for the controllers 208, 210 to communicate with each other without communicating with or through the controller 200.

In one embodiment, the communication systems 100, 300, 400 may include some or all of the same components. For example, one or more of the communication systems 100, 300, 400 may include the controllers 200, 208, 210, the control system 202, and/or the sensors 302, 304, etc.

The networks formed by the communication systems 100, 300, 400 can provide for time-sensitive network (TSN) communications between the controllers 200, 208, 210 and/or the control systems 202. This type of communication provides for time-synchronized, low latency data deterministic streaming between these components in the systems 100, 300, 400.

The communication systems 100, 300, 400 may communicate network data between and/or among the vehicles 104, 106 in the vehicle system 102 by combining all data from the controllers 200, 208, 210, the control systems 202, and/or the sensors 302, 304 into a single payload of a data packet that is periodically communicated. For example, the controllers 200, 208, 210 and/or control systems 202 may insert all commands, instructions, etc. that are determined or generated by the controllers 200, 208, 210 and/or control systems 202 into the same payload of the same data packet and communicate the data packet periodically. Alternatively, the controllers 200, 208, 210 and/or control systems 202 may insert less than all commands, instructions, etc. into the same data packet, may insert the commands, instructions, etc. into different data packets, and/or may insert the commands, instructions, etc. into one or more data packets that are communicated in non-periodic messages.

The controller 200 may implement different control schemes for handing setup of the communication systems 100, 300, 400 at different operating points. A control scheme may designate which controller 200 and/or control system 202 is in charge or in command of operations of the vehicle system 102, while the other controller 200 and/or control systems 202 do not control the operations of the vehicle system 102. For example, during a first period of time, a first control scheme may designate the controller 200 as being the component that controls the operations of the vehicle system 102, while the other control systems 202 and/or the operator is unable to control the operations of the vehicle system 102. Responsive to a change in operating points (e.g., a change in location, speed, acceleration, and/or health of the vehicle system 102, receipt of manual changes to throttles and/or brakes of the vehicle system 102, etc.), a second control scheme may be implemented that designates one of the control systems 202 as being the component that controls the operations of the vehicle system 102.

In one embodiment, the greater bandwidth provided by communicating data via the network connections 204 and/or the pathway 214 in the communication systems 100, 300, 400 can allow for improved graphical user interfaces on the output devices 206. For example, in contrast to using simple monochromatic displays, improved graphical displays that allow use of a variety of colors, shapes, designs, etc., may be used by the controller 200 to present output to an operator via the output device 206. In one aspect, a graphics standard such as HTML5 may be used to populate the operator display on the output device 206 or a portion of the operator display on the output device 206 for operations or maintenance features of the vehicle system 102.

The controller 200 may be used to load additional software onto the control systems 202. For example, updates to software running on the control systems 202 may be updated, revised, replaced, or otherwise modified by loading the software on the controller 200, which interacts with the control systems 202 via the network connections 204. This can allow for software running on the control systems 202 to be updated from a centralized, single location instead of requiring an operator to separately update each separate control system 202, which may not be readily accessible. In one aspect, the controller 200 may allow for third party software to be loaded onto the control systems 202 via the controller 200. Some known vehicle systems 102 do not permit for third party (e.g., parties other than the OEM of the vehicle 104, 106 and/or vehicle system 102) applications to be loaded onto the control systems 202 due to the limited bandwidth and reliability issues of currently used pathways onboard the vehicle systems. The network formed by the network connections 204 and/or pathway 214 in the communication systems 100, 300, 400 described herein can allow for third party applications to be loaded onto the control systems 202 via the controller 200. The increased bandwidth and redundant communication paths provided by the communication systems 100, 300, 400 can allow for these third party applications to be loaded via the controller 200.

The control systems 202, controllers 200, 208, 210, and/or sensors 302, 304 may generate operational logs that track operations of the vehicle system 102 and/or other components of the vehicle system 102. The logs may include data representative of speeds, accelerations, throttle positions, brake settings, temperatures, vibrations, coupler forces, faults, operational settings, etc., that are identified or determined by the control systems 202, controllers 200, 208, 210, and/or sensors 302, 304, optionally along with times and/or locations of the vehicle system 102 where the data is measured, identified, determined, etc. The controller 200 may receive the logs from different control systems 202, controllers 208, 210, and/or sensors 302, 304 onboard the same or different vehicle 104, 106 via the network connections 204 and/or pathway 214, and can integrate the different logs into an omnibus log. Such a log can include the data from the different sources into a single combined record of the data included in the different logs. In one embodiment, the controller 200 may synchronize the data in the different logs so that the data in the omnibus log is provided with the same time and/or distance scale. For example, different components of the communication systems 100, 300, 400 and/or vehicle system 102 may sample and/or record data at different rates such that the log from one component includes data measured at different times and/or locations, and/or includes a different amount of data, than one or more other logs. The controller 200 may change the time scales of one or more of the logs so that the data in the omnibus log is presented on the same time scale. For example, if a first log includes data measured once every hour and a second log includes data measured once every minute, then the controller 200 may space apart the data in the first log in the omnibus log so that the data from the first log appears once every hour while the data from the second log appears once every minute. The controller 200 may present the omnibus log on the output device 206 and/or communicate the omnibus log to the off-board system 218 for review and/or storage.

In one embodiment, the control systems 202 and/or sensors 302, 304 can represent removable electronic devices. Removable electronic devices can include hardware that provides functionality to operation of the vehicle system 102, but that may be removed while the vehicle system 102 continues to operate and propel cargo and/or passengers along the route 110. In order to track which of these devices are currently onboard and operational, the controller 200 may need to be notified of unique identifiers of the devices, such as serial numbers or other unique identifying information. The devices may communicate the unique identifiers to the controller 200 via the network connections 204 and/or pathway 214, and the controller 200 may store the identifiers to track what devices are onboard the vehicle system 102, locations of the devices, statuses of the devices, etc. The controller 200 optionally may communicate this information to the off-board system 218 for tracking by the off-board system 218. For example, the off-board system 218 may monitor current locations of the devices spread out among several different vehicle systems 102.

Figure 5:
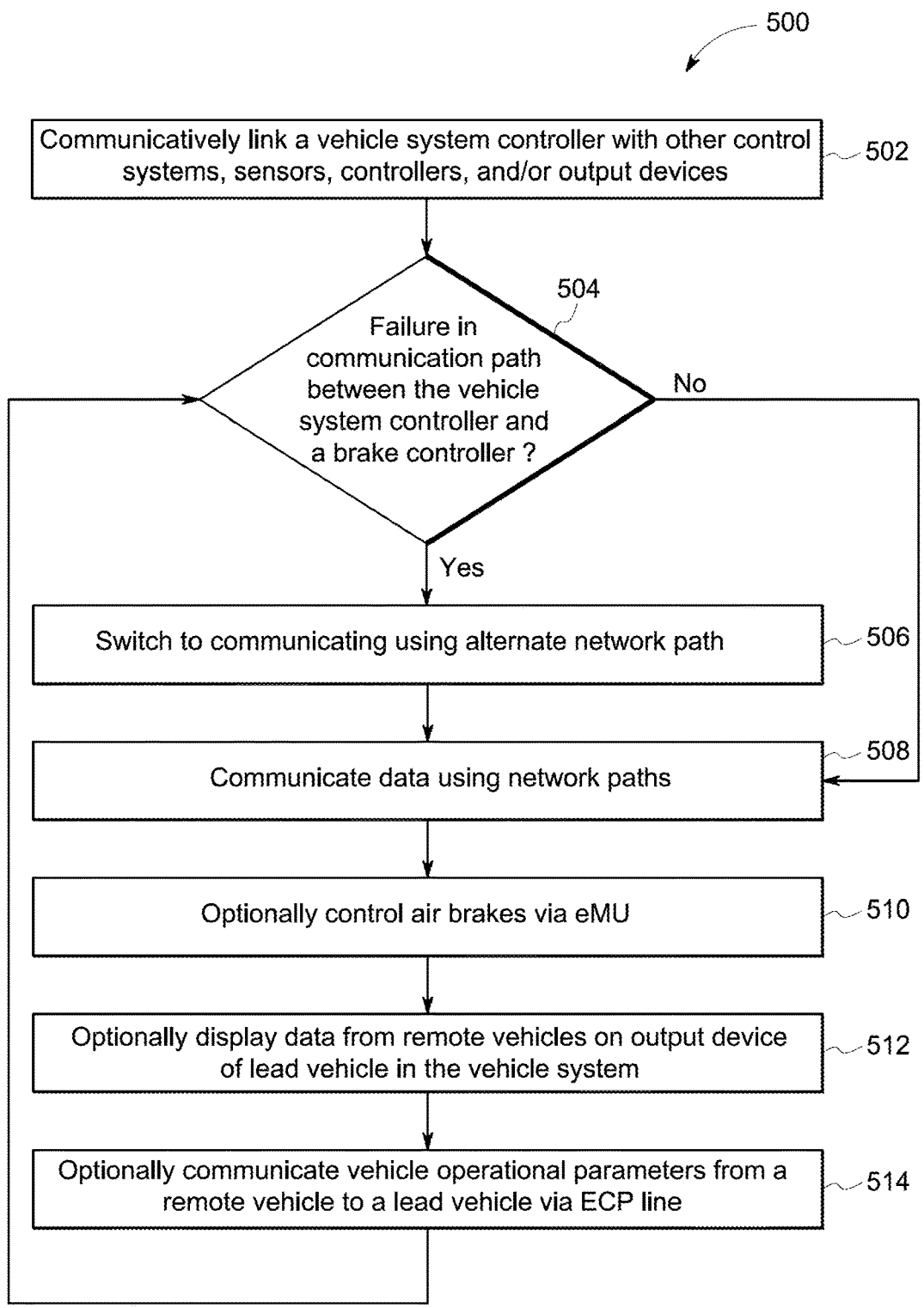
FIG. 5 illustrates a flowchart of one embodiment of a method for communicating with and/or within a vehicle system.

FIG. 5 illustrates a flowchart of one embodiment of a method 500 for communicating with and/or within a vehicle system. The method 500 may be performed using one or more embodiments of the communication systems described herein. At 502, a vehicle system controller is communicatively linked with one or more control systems, sensors, other controllers, and/or output devices. The controller may be linked using network connections, such as Ethernet cables, ECP trainlines, or other cables or conductive pathways. These connections can form a network between the components of the communication system.

At 504, a determination is made as to whether one or more of the communication links has failed. For example, a determination may be made as to whether a communication path between the vehicle system controller and a brake controller is no longer able to communicate data between the vehicle system controller and the brake controller. If the communication path has failed, then an alternate path may be needed to ensure that the vehicle system controller can continue operating the brakes of the vehicle system. As a result, flow of the method 500 can proceed toward 506. If the communication path has not failed, then the vehicle system controller may continue controlling the brakes of the vehicle system using the communication path, and flow of the method 500 can proceed toward 508.

At 506, the vehicle system controller can switch communication paths for communicating with the brake controller. For example, if the network connection between the vehicle system controller and the EAB controller fails, then the vehicle system controller can continue controlling the brakes of the vehicle system by communicating with the ECP controller and/or by communicating with the EAB controller using another network connection (e.g., via the ECP controller and/or one or more network hubs).

At 508, data is communicated using the network paths. For example, the vehicle system controller can communicate with the brake controllers (e.g., the EAB and/or ECP controllers), sensors, other control systems, output devices, etc., using the network paths and/or the alternate network paths. At 510, the brakes of the vehicle system optionally are controlled via a network path. For example, air brakes of the vehicle system may be activated or disengaged by the vehicle system controller communicating data packets along the MU cable, which can be referred to as Ethernet over MU cable, or eMU. Alternatively, another cable may be used.

At 512, data from one or more remote vehicles in the vehicle system optionally is displayed on the output device onboard the lead vehicle. The data can be communicated from the remote vehicles through the network paths to the vehicle system controller, which can direct the output device on the lead vehicle to present the data to an operator. At 514, vehicle operational parameters optionally are communicated from one or more remote vehicles to the lead vehicle via a network path. In one example, these parameters can be communicated via the ECP line that extends along the length of the vehicle system. The parameters can include data representative of a status of cargo onboard a vehicle, a temperature onboard a vehicle, weight of cargo on a vehicle, vibrations onboard a vehicle, coupler forces, etc. The parameters can be used by one or more control systems to control movement of the vehicle system and/or can be communicated to one or more off-board systems. Flow of the method 500 may then return toward 504 or may terminate.

In another embodiment, the vehicle system may concurrently use multiple different communication paths with the different brake controllers in order to control operation of the brakes of the vehicle system. If one of the brake controllers fails or the vehicle controller is no longer able to communicate with or control one of the brake controllers, then the vehicle controller may switch to communicating with another brake controller to control the brakes of the vehicle system.

In one embodiment, a system (e.g., a communication system) includes a vehicle system controller configured to control operation of a vehicle system, one or more brake controllers configured to control operation of a brake of the vehicle system, and one or more network connections between the vehicle system controller and the one or more brake controllers. The one or more network connections are configured to communicate data packets between the vehicle system controller and the one or more brake controllers to allow the vehicle system controller to control the brake of the vehicle system.

In one aspect, the one or more brake controllers include an electronic air brake (EAB) controller configured to control the brake of the vehicle system by changing air pressure in a conduit extending along the vehicle system and an electronically controlled pneumatic (ECP) brake controller configured to control the brake of the vehicle system by communicating an electronic signal along an ECP line extending along the vehicle system.

In one aspect, the vehicle system controller is configured to switch from communicating with one of the EAB controller or the ECP brake controller via the one or more network connections to communicating with another of the EAB controller or the ECP brake controller via the one or more network connections responsive to a failure in at least one of the network connections.

In one aspect, the system also includes a network hub configured to communicatively couple the EAB controller with the ECP brake controller. The EAB controller and the ECP brake controller can be configured to communicate with each other via the network hub without communicating with each other via the vehicle system controller.

In one aspect, the vehicle system controller is configured to be disposed onboard a first vehicle of the vehicle system. The system also can include one or more sensors configured to be disposed onboard a different, second vehicle of the vehicle system and configured to communicate sensed operational parameters of the second vehicle to the vehicle system controller via the one or more network connections.

In one aspect, the system also includes an output device configured to be disposed onboard the vehicle system. The vehicle system controller can be configured to direct the output device to present the operational parameters on the output device.

In one aspect, the operational parameters include a weight of one or more of cargo or passengers onboard the second vehicle.

In one aspect, the operational parameters include a status of a refrigerated car.

In one aspect, the vehicle system controller is configured to communicate with the one or more brake controllers using time sensitive network communication.

In one aspect, the one or more brake controllers are configured to consolidate data to be communicated to the vehicle system controller into a single data packet and to periodically communicate the data packet to the vehicle system controller.

In one aspect, the controller is configured to receive and communicate one or more of new software, a software update, or a software revision to a control system disposed onboard the vehicle system via the one or more network connections.

In one aspect, the vehicle system controller is configured to communicate sensor data received from one or more sensors disposed on another vehicle of the vehicle system via the one or more network connections to an off-board system.

In one aspect, the system also can include one or more electronic devices configured to perform one or more functions of the vehicle system. The one or more electronic devices are configured to communicate one or more unique identifiers of the one or more electronic devices to the vehicle system controller.

In one embodiment, a method (e.g., for communicating with and/or within a vehicle system) includes communicatively linking a vehicle system controller configured to control operation of a vehicle system with one or more brake controllers configured to control operation of a brake of the vehicle system via one or more network connections and communicating data packets between the vehicle system controller and the one or more brake controllers to allow the vehicle system controller to control the brake of the vehicle system.

In one aspect, the one or more brake controllers include an electronic air brake (EAB) controller configured to control the brake of the vehicle system by changing air pressure in a conduit extending along the vehicle system and an electronically controlled pneumatic (ECP) brake controller configured to control the brake of the vehicle system by communicating an electronic signal along an ECP line extending along the vehicle system.

In one aspect, the method also includes switching the vehicle system controller from communicating with one of the EAB controller or the ECP brake controller via the one or more network connections to communicating with another of the EAB controller or the ECP brake controller via the one or more network connections responsive to a failure in at least one of the network connections.

In one aspect, the method also includes communicatively linking a network hub with the EAB controller and the ECP brake controller. The EAB controller and the ECP brake controller can be configured to communicate with each other via the network hub without communicating with each other via the vehicle system controller.

In one aspect, the method also includes sensing operational parameters of a remote vehicle of the vehicle system and communicating the operational parameters that are sensed to the vehicle system controller onboard a lead vehicle of the vehicle system via the one or more network connections.

In one aspect, the method also can include directing an output device disposed onboard the lead vehicle to present the operational parameters on the output device.

In one aspect, the operational parameters include a weight of one or more of cargo or passengers onboard the remote vehicle.

In one aspect, the operational parameters include a status of a refrigerated car.

In one aspect, communicating the data packets includes communicating with the one or more brake controllers using time sensitive network communication.

In one aspect, the method also can include consolidating data to be communicated to the vehicle system controller into a single data packet and to periodically communicating the data packet to the vehicle system controller.

In one aspect, the method also can include receiving, at the vehicle system controller, and communicating one or more of new software, a software update, or a software revision to a control system disposed onboard the vehicle system via the one or more network connections.

In one aspect, the method also can include communicating sensor data received from one or more sensors disposed on another vehicle of the vehicle system via the one or more network connections to an off-board system.

In one aspect, the method also can include communicating one or more unique identifiers of one or more electronic devices configured to perform one or more functions of the vehicle system to the vehicle system controller.

In one embodiment, a system (e.g., a communication system) includes a vehicle system controller configured to control operation of a vehicle system, an electronic air brake (EAB) controller configured to control a brake of the vehicle system by changing air pressure in a conduit extending along the vehicle system, an electronically controlled pneumatic (ECP) brake controller configured to control the brake of the vehicle system by communicating an electronic signal along an ECP line extending along the vehicle system, and one or more network connections among the vehicle system controller, the EAB controller, and the ECP brake controller. The one or more network connections are configured to communicate data packets one or more of between or among two or more of the vehicle system controller, the EAB controller, or the ECP controller to allow the vehicle system controller to control the brake of the vehicle system.

In one aspect, the vehicle system controller is configured to switch from communicating with one of the EAB controller or the ECP brake controller via the one or more network connections to communicating with another of the EAB controller or the ECP brake controller via the one or more network connections responsive to a failure in at least one of the network connections.

In one aspect, the system also includes a network hub configured to communicatively couple the EAB controller with the ECP brake controller. The EAB controller and the ECP brake controller can be configured to communicate with each other via the network hub without communicating with each other via the vehicle system controller.

In any of the embodiments set forth herein, data communicated to a vehicle in a vehicle consist may be used to control the vehicle for moving along a route, or otherwise for controlling a mechanical, electrical, or electro-mechanical system that is operated in relation to the vehicle moving along the route. That is, the data is received at the vehicle, and the vehicle is controlled, as relating to moving along the route, based on the informational content of the data.

In the context of "communication link" or "linked by a communication channel," "link"/"linked" refers to both physical interconnections for communication (such as over a cable, wire, or other conductor) and to wireless communications, using radio frequency or other wireless technologies.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
   a vehicle system controller configured to control operation of a vehicle system;
   one or more brake controllers configured to control operation of a brake of the vehicle system, the one or more brake controllers communicatively coupled with each other by an electronically controlled pneumatic (ECP) line extending along the vehicle system; and
   one or more network connections between the vehicle system controller and the one or more brake controllers, the one or more network connections configured to communicate data packets between the vehicle system controller and the one or more brake controllers along the ECP line to allow the vehicle system controller to control the brake of the vehicle system,
   wherein the one or more brake controllers include an electronic air brake (EAR) controller configured to control the brake of the vehicle system by changing air pressure in a conduit extending along the vehicle system and an ECP brake controller configured to control the brake of the vehicle system by communicating an electronic signal along the ECP line extending along the vehicle system;
   wherein the vehicles system controller is configured to one or more of:
   switch from communicating with the EAB controller via the one or more network connections to communicating with the ECP brake controller via the one or more network connections responsive to a failure in at least one of the network connections, or
   switch from communicating with the ECP brake controller via the one or more network connections to communicating with the EAB controller via the one or more network connections responsive to the failure in at least one of the network connections.

2. The system of claim 1, further comprising one or more electronic devices configured to perform one or more functions of the vehicle system, wherein the one or more electronic devices are configured to communicate one or more unique identifiers of the one or more electronic devices to the vehicle system controller.

3. The system of claim 1, further comprising a network hub configured to communicatively couple the EAB controller with the ECP brake controller, wherein the EAB controller and the ECP brake controller are configured to communicate with each other via the network hub without communicating with each other via the vehicle system controller.

4. The system of claim 1, wherein the vehicle system controller is configured to be disposed onboard a first vehicle of the vehicle system, and further comprising one or more sensors configured to be disposed onboard a different, second vehicle of the vehicle system and configured to communicate sensed operational parameters of the second vehicle to the vehicle system controller via the one or more network connections.

5. The system of claim 4, further comprising an output device configured to be disposed onboard the vehicle system, wherein the vehicle system controller is configured to direct the output device to present the operational parameters on the output device.

6. The system of claim 4, wherein the operational parameters include a weight of one or more of cargo or passengers onboard the second vehicle.

7. The system of claim 4, wherein the operational parameters include a status of a refrigerated car.

8. The system of claim 1, wherein the vehicle system controller is configured to communicate with the one or more brake controllers using time sensitive network communication.

9. The system of claim 1, wherein the one or more brake controllers are configured to consolidate data to be communicated to the vehicle system controller into a single data packet and to periodically communicate the data packet to the vehicle system controller.

10. The system of claim 1, wherein the vehicle system controller is configured to receive and communicate one or more of new software, a software update, or a software revision to a control system disposed onboard the vehicle system via the one or more network connections.

11. The system of claim 1, wherein the vehicle system controller is configured to communicate sensor data received from one or more sensors disposed on another vehicle of the vehicle system via the one or more network connections to an off-board system.

12. A method comprising:
    communicatively linking, via one or more network connections, a vehicle system controller configured to control operation of a vehicle system with one or more electronic air brake (EAB) controllers and one or more electronically controlled pneumatic (ECP) brake controllers configured to control operation of a brake of the vehicle system;
    communicating data packets between the vehicle system controller and the one or more EAB controllers and the one or more ECP brake controllers to allow the vehicle system controller to control the brake of the vehicle system; and
    on or more of:
    switching the vehicle system controller from communicating with the EAB controllers via the one or more network connections to communicating with the ECP brake controllers via the one or more network connections responsive to a failure in at least one of the network connections, or
    switching the vehicle system controller from communicating with the ECP brake controllers via the one or more network connections to communicating with the EAB controllers via the one or more network connections responsive to the failure in at least one of the network connections.

13. The method of claim 12, further comprising directing an output device disposed onboard a lead vehicle to present the operational parameters on the output device, the operational parameters that are presented on the output device including one or more of a weight of cargo or passengers onboard a remote vehicle or a status of a refrigerated car.

14. The method of claim 12, wherein the one or more EAB controllers are configured to control the brake of the vehicle system by changing air pressure in a conduit extending along the vehicle system and the one or more ECP brake controllers are configured to control the brake of the vehicle system by communicating an electronic signal along an ECP line extending along the vehicle system.

15. The method of claim 12, further comprising communicatively linking a network hub with the one or more EAB controllers and the one or more ECP brake controllers, wherein the one or more EAB controllers and the one or more ECP brake controllers are configured to communicate with each other via the network hub without communicating with each other via the vehicle system controller.

16. A system comprising:
   a vehicle system controller configured to control operation of a vehicle system;
   an electronic air brake (EAB) controller configured to control a brake of the vehicle system by changing air pressure in a conduit extending along the vehicle system;
   an electronically controlled pneumatic (ECP) brake controller configured to control the brake of the vehicle system by communicating an electronic signal along an ECP line extending along the vehicle system; and
   one or more network connections among the vehicle system controller, the EAB controller, and the ECP brake controller, the one or more network connections configured to communicate data packets one or more of between or among two or more of the vehicle system controller, the EAB controller, or the ECP controller to allow the vehicle system controller to control the brake of the vehicle system;
   wherein the vehicle system controller is configured to one or more of:
      switch from communicating with the EAB controller via the one or more network connections to communicating with the ECP brake controller via the one or more network connections responsive to a failure in at least one of the network connections, or
      switch from communicating with the ECP brake controller via the one or more network connections to communicating with the EAB controller via the one or more network connections responsive to the failure in at least one of the network connections.

17. The system of claim 16, further comprising a network hub configured to communicatively couple the EAB controller with the ECP brake controller, wherein the EAB controller and the ECP brake controller are configured to communicate with each other via the network huh without communicating with each other via the vehicle system controller.

* * * * *

UNITED STATES PATENT AND TRADEMARK OFFICE
CERTIFICATE OF CORRECTION

PATENT NO. : 10,046,778 B2
APPLICATION NO. : 15/347817
DATED : August 14, 2018
INVENTOR(S) : Stephen Michael Crane et al.

It is certified that error appears in the above-identified patent and that said Letters Patent is hereby corrected as shown below:

In the Claims

In Column 15, Line 36, Claim 1 replace "EAR" with -- EAB --.

In Column 15, Line 43, Claim 1 replace "wherein the vehicles system controlller" with -- wherein the vehicle system controller --.

Signed and Sealed this
Twenty-seventh Day of November, 2018

Andrei Iancu
*Director of the United States Patent and Trademark Office*